US009442487B1

(12) United States Patent
Ferguson et al.

(10) Patent No.: US 9,442,487 B1
(45) Date of Patent: Sep. 13, 2016

(54) CLASSIFIER HIERARCHIES FOR TRAFFIC LIGHT AND TRAFFIC INDICATOR DETECTION

(71) Applicant: Google Inc., Mountain View, CA (US)

(72) Inventors: David Ian Franklin Ferguson, Mountain View, CA (US); Andreas Wendel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 14/461,031

(22) Filed: Aug. 15, 2014

(51) Int. Cl.
*G05D 1/02* (2006.01)
*G01S 3/46* (2006.01)
*G08G 1/01* (2006.01)
*G01J 3/02* (2006.01)
*G08G 1/09* (2006.01)
*G06K 9/00* (2006.01)
*G01J 3/46* (2006.01)
G08G 1/0967 (2006.01)

(52) U.S. Cl.
CPC .......... *G05D 1/0231* (2013.01); *G01J 3/0289* (2013.01); *G01J 3/46* (2013.01); *G08G 1/0104* (2013.01); *G06K 9/00798* (2013.01); *G08G 1/09675* (2013.01); *Y10S 901/01* (2013.01)

(58) Field of Classification Search
CPC ... G08G 1/0104; G08G 1/09675; G01J 3/46; G01J 3/0289; G01J 3/505; Y10S 901/01; G05D 1/0231; G06K 9/00798
See application file for complete search history.

(56) References Cited

U.S. PATENT DOCUMENTS

| 6,396,417 | B2 | 5/2002 | Lee |
| 6,707,391 | B1 | 3/2004 | Monroe |
| 8,031,062 | B2 | 10/2011 | Smith |
| 8,692,996 | B2 | 4/2014 | Davis |
| 2013/0211682 | A1* | 8/2013 | Joshi ................... G08G 1/0967 701/70 |
| 2014/0142809 | A1 | 5/2014 | Schofield |

* cited by examiner

*Primary Examiner* — Yonel Beaulieu
*Assistant Examiner* — Thomas Ingram
(74) *Attorney, Agent, or Firm* — McDonnell Boehnen Hulbert & Berghoff LLP

(57) ABSTRACT

The present disclosure is directed to an autonomous vehicle having a vehicle control system. The vehicle control system includes an image processing system. The image processing system receives an image that includes a light indicator. The light indicator includes an illuminated component. The image processing system determines a color of the illuminated component of the light indicator and an associated confidence level of the determination of the color of the illuminated component. The image processing system also determines a shape of the illuminated component of the light indicator and an associated confidence level of the determination of the shape of the illuminated component. The determined confidence levels represent an estimated accuracy of the determinations of the shape and color. Additionally, the image processing system provides instructions executable by a computing device to control the autonomous vehicle based on at least one of the determined confidence levels exceeding a threshold value.

15 Claims, 8 Drawing Sheets

COMPUTER PROGRAM PRODUCT 500

SIGNAL BEARING MEDIUM 501

PROGRAM INSTRUCTIONS 502

- RECEIVE AN IMAGE THAT INCLUDES A LIGHT INDICATOR

- DETERMINE A COLOR OF AN ILLUMINATED COMPONENT OF THE LIGHT INDICATOR AND A CONFIDENCE LEVEL OF THE DETERMINATION OF THE COLOR

- DETERMINE A COLOR OF AN ILLUMINATED COMPONENT OF THE LIGHT INDICATOR AND A CONFIDENCE LEVEL OF THE DETERMINATION OF THE COLOR

- DETERMINE A CHARACTERISTIC OF A STATE OF THE LIGHT INDICATOR BASED ON AT LEAST ONE OF THE CONFIDENCE LEVEL OF THE DETERMINATION OF THE COLOR AND THE CONFIDENCE LEVEL OF THE DETERMINATION OF THE SHAPE EXCEEDING A THRESHOLD VALUE

- PROVIDE INSTRUCTIONS TO CONTROL THE AUTONOMOUS VEHICLE BASED ON THE DETERMINED CHARACTERISTIC OF THE STATE OF THE LIGHT INDICATOR

| COMPUTER READABLE MEDIUM 503 | COMPUTER RECORDABLE MEDIUM 504 | COMMUNICATIONS MEDIUM 505 |

FIG. 5

CLASSIFIER HIERARCHIES FOR TRAFFIC LIGHT AND TRAFFIC INDICATOR DETECTION

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present application discloses embodiments that relate to detection of light indicators in an image or video captured by an image-capture device coupled to an autonomous vehicle. In one aspect, the present application describes a method. The method includes receiving, from the image-capture device coupled to the autonomous vehicle, an image that includes a light indicator. The light indicator includes an illuminated component. Additionally, the method includes determining, from the received image, a color of the illuminated component of the light indicator and an associated confidence level of the determination of the color of the illuminated component. The method also includes determining, from the received image, a shape of the illuminated component of the light indicator and an associated confidence level of the determination of the shape of the illuminated component. The method also includes determining a characteristic of a state of the light indicator based on at least one of the confidence level of the determination of the color and the confidence level of the determination of the shape exceeding a threshold value. Further, the method includes providing instructions executable by a computing device to control the autonomous vehicle based on the determined characteristic of the state of the light indicator.

In another aspect, the present application describes an image processing system. The image processing system includes an image-capture device, at least one processor, and a memory. The memory has stored thereon instructions that, upon execution by the at least one processor, cause the control system to perform functions. The functions include receiving, from the image-capture device coupled to the autonomous vehicle, an image that includes a particular traffic indicator. The functions also include determining, from one or more predetermined colors, a color of the particular traffic indicator in the received image and an associated confidence level of the determination of the color. The confidence of the determination of the color represents an estimated accuracy of the determined color. The functions further include determining, from one or more predetermined shapes, a shape of the particular traffic indicator in the received image and an associated confidence level of the determination of the shape. The confidence level of the determination of the shape represents an estimated accuracy of the determined shape. Additionally, the functions include providing executable instructions to control the autonomous vehicle based on at least one of the confidence level of the determination of the color and the confidence level of the determination of the shape exceeding a threshold value.

In yet another aspect, the present disclosure describes a non-transitory computer readable medium having stored thereon instructions that, upon execution by at least one processor of a computing device, cause the computing device to perform functions. The functions include receiving, from an image-capture device coupled to an autonomous vehicle, an image that includes a particular light indicator. The particular light indicator includes an illuminated component. The functions also include determining, from the received image, a color of the illuminated component of the light indicator and an associated confidence level of the determination of the color based on first training data. The first training data indicates a first plurality of illuminated components of light indicators. The functions further include determining, from the received image, a shape of the illuminated component of the light indicator and an associated confidence level of the determination of the shape based on second training data. The second training data indicates of a second plurality of illuminated components of light indicators. The functions also include determining a characteristic of a state of the light indicator based on at least one of the confidence level of the determination of the color and the confidence level of the determination of the shape exceeding a threshold value. Additionally, the functions include providing instructions executable by a computing device to control the autonomous vehicle based on the determined characteristic of the state of the light indicator.

In another aspect, the present application describes a system. The system includes a means for receiving, from the image-capture device coupled to the autonomous vehicle, an image that includes a light indicator. The light indicator includes an illuminated component. Additionally, the system includes a means for determining, from the received image, a color of the illuminated component of the light indicator and an associated confidence level of the determination of the color of the illuminated component. The system also includes a means for determining, from the received image, a shape of the illuminated component of the light indicator and an associated confidence level of the determination of the shape of the illuminated component. The system also includes a means for determining a characteristic of a state of the light indicator based on at least one of the confidence level of the determination of the color and the confidence level of the determination of the shape exceeding a threshold value. Further, the system includes a means for providing instructions executable by a computing device to control the autonomous vehicle based on the determined characteristic of the state of the light indicator.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 illustrates an example computer readable medium configured for real-time image-based traffic light detection.

DETAILED DESCRIPTION

Figure 1:
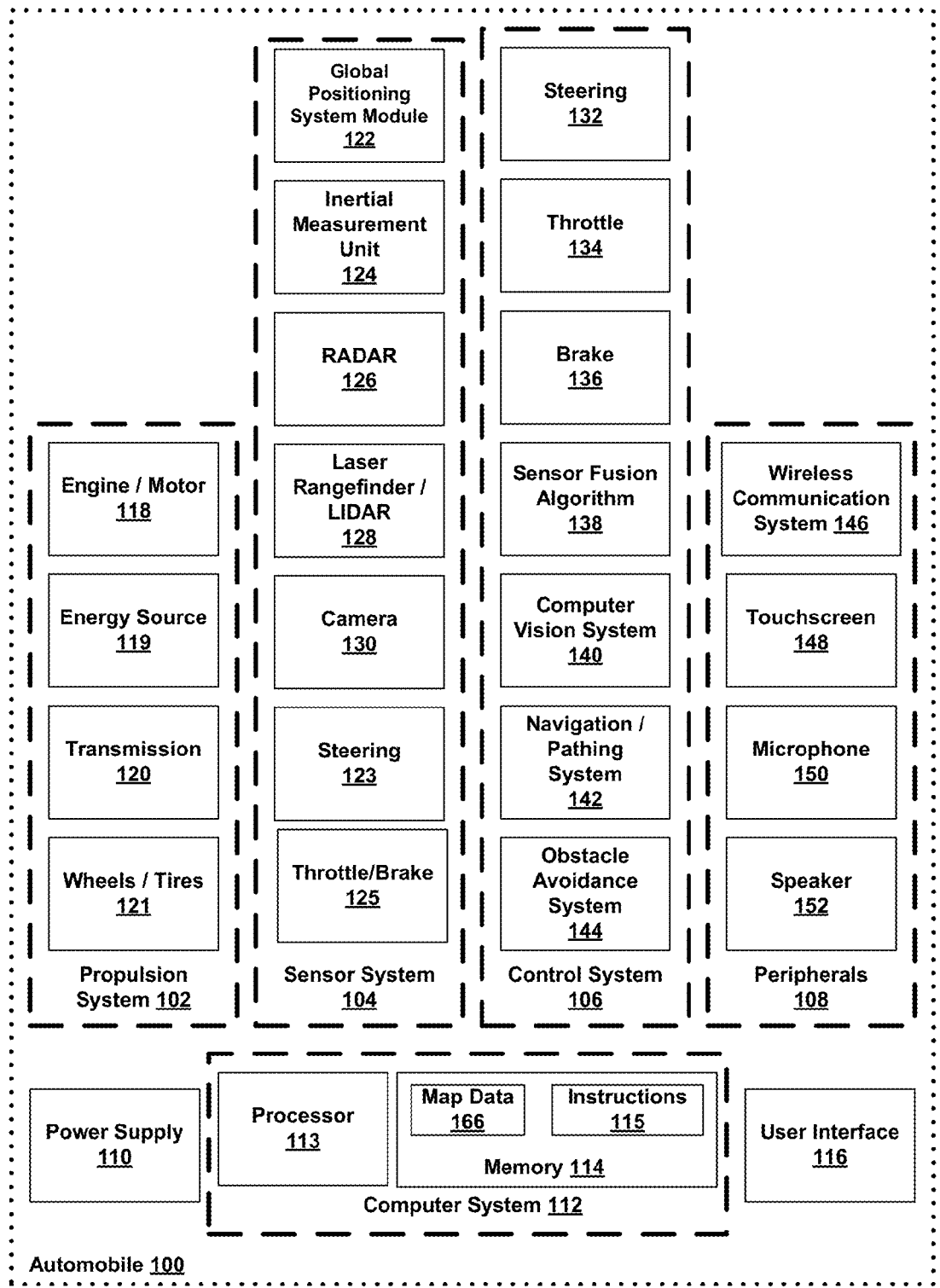
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example embodiment involves an autonomous vehicle configured with an imaging system. The imaging system may include a camera configured to capture images, video, or both images and video. The captured images and video are stored in a memory for processing. Some or all of the captured images may be forward-facing images of a field of view of the vehicle. For example, some of the images captured by the imaging system may resemble the view a driver of the vehicle may see as the driver operates the vehicle. Additional images may capture side and rear views from the vehicle as well.

A processing system in the autonomous vehicle is configured to detect traffic lights, other light indicators, or other traffic indicators (such as road signs) associated with directing traffic flow of vehicles and pedestrians in the captured images and videos. A traffic light or other light indicator might include one or more illuminated components. The processing system is also configured to determine attributes of the detected traffic lights or other traffic indicators, such as the color and shape of an illuminated portion of the traffic light. Other attributes, such as the shape of a traffic indicator and text or symbols on a traffic indicator may also be determined by the processing system. A confidence level for each attribute is also determined by the processing system indicating an estimated accuracy that the attribute was correctly determined. In some cases, a confidence level for a given attribute that exceeds a threshold value indicates that the given attribute was correctly determined. The processing system provides instructions to the control system of the autonomous vehicle based on the determined attributes and confidence levels. A particular instruction may be associated with one or more combinations of attributes and confidence levels.

In some instances, an attribute of a traffic light may be determined with a low level of confidence, such that only some of the attributes are confidently determined, and the state of the traffic light is only partially known. In these instances, the processing system provides instructions to control the vehicle based on the limited knowledge of the state of the traffic light. As an example, the processing system may determine an illuminated component of a traffic light to be red with a high level of confidence, but the shape of the illuminated portion is determined with a low level of confidence. In this example, the processing system may provide instructions to safely control the vehicle even though the state of the traffic light is only partially known. As another example, the processing system may determine that a traffic indicator is a red octagon with a high level of confidence, but the text on the traffic indicator is determined with a low level confidence. Thus, in some scenarios, only one characteristic (e.g. the color or shape of the illuminated component) of the state of the traffic light may be determined with high confidence. In these examples, the processing system may provide instructions to safely control the vehicle even though a limited amount of information can be determined about the traffic indicator.

In some cases, a particular attribute of an illuminated component of a traffic light may be considered more important to the operation of the autonomous vehicle than other attributes. The processing system may determine that particular attribute before determining other attributes in order to quickly obtain important information about state of the traffic light. In some cases, the particular attribute may provide a sufficient basis for controlling the autonomous vehicle, such that determining other attributes of the illuminated component of the traffic light is not required. In other cases, if only a partial state of the traffic light is determined (e.g. if only one of the characteristics of the traffic light is determined), the processing system may provide instructions to carefully control the vehicle based on the determined characteristics of the state of the traffic light.

A control system of the vehicle may responsively adjust the vehicle control when traffic lights, other light indicators, or other traffic indicators are detected in the captured image. For example, the control system may alter a course of the vehicle or alter a speed of the vehicle. Additionally, the control system may record the position of the vehicle detected in the image. The control system may calculate vehicle control signals based on vehicles detected within the field of view.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a turn signal indicator, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
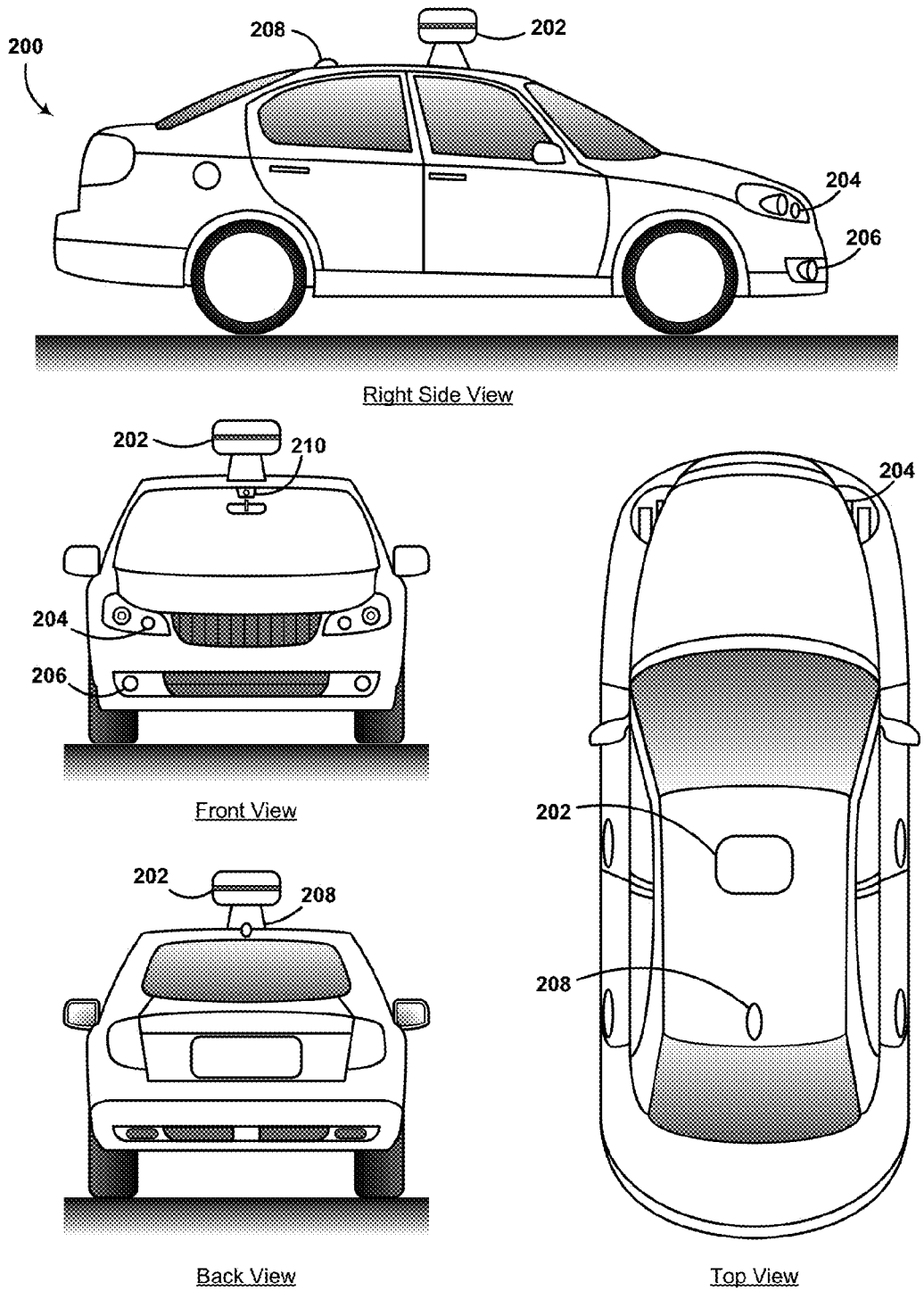
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
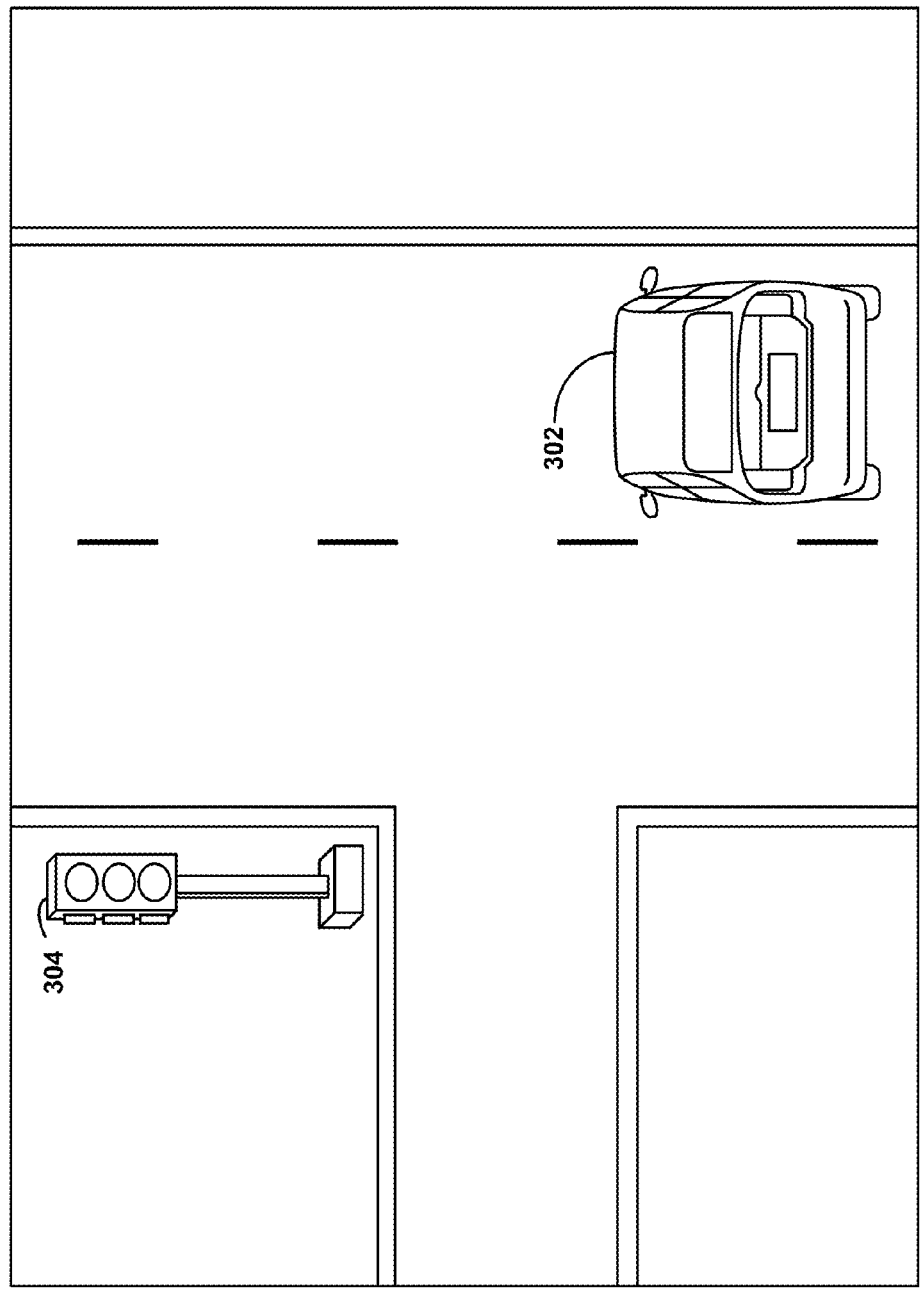
FIG. 3A illustrates an example scenario in which an example method may be carried out.

FIG. 3A illustrates an example scenario in which an example method may be carried out. The example scenario shown in FIG. 3A serves merely as an illustration and may vary in different scenarios. Similarly, other example situations or scenarios may exist as well. In the example scenario shown in FIG. 3A, a computing device associated with autonomous vehicle 302, whether in control or assisting the driver, may use one or more image-capture devices to capture images of the surrounding environment of the vehicle. For example, the image-capture devices may be built into the grill or front dashboard of the vehicle and capture images of the space including objects within the front path of the vehicle. Similarly, the image-capture devices may be placed in various places on the vehicle and may be configured to capture different portions of the environment around the vehicle. The autonomous vehicle 302 in FIG. 3A may be similar or identical to vehicle 100 from FIG. 1 or vehicle 200 from FIG. 2. Components of vehicle 100 and vehicle 200 may also be included in the autonomous vehicle 302.

Although the computing device may be capable of determining objects, such as traffic lights, other light indicators, or traffic signs associated with directing traffic flow of vehicles and pedestrians, processing may require time and/or resources from the computing device or other devices.

Thus, as discussed above, the computing device may use additional information received from other sources coupled to or associated with the vehicle, such as RADAR, LIDAR, other cameras, GPS, or other various sensors in order to process the image. The computing device may receive information about various characteristics of the objects or the environment surrounding the vehicle from other sources. Based on the information received from other sources, the computing device may process images received from the image-capture device. The computing device may be configured to use characteristics of an object to determine a portion of the image that includes the object for the computing device to analyze. For example, the computing device may use the assisted image processing to find the visual features within the image that reveal information about the object. For example, the computing device may use image processing to locate a traffic light from an image and identify characteristics of that traffic light. Similarly, the computing device may be configured to determine approximate locations of objects within the image based on information received from other sources coupled to the vehicle. For instance, the computing device may receive, or have stored on a memory, map data including geo-location information for roads, traffic signs, and traffic lights, among other data. In some embodiments, the computing device may utilize the map data in order to determine the approximate locations of objects in an image.

In some examples, the computing device may receive information through a wired-connection or wirelessly from, for example, the wireless communication system 146. The wireless communication system may send and/or receive information that modifies aspects of the method of the present disclosure, such as various thresholds and machine-learning training data.

FIG. 3A illustrates a scenario in which an example method may be performed to detect a traffic light. FIG. 3A depicts an autonomous vehicle 302 at an intersection and a traffic light 304 that controls the flow of traffic at the intersection. Although the intersection depicted is a three-way intersection, an autonomous vehicle 302 may perform the example method at or near a four-way intersection, traffic circle, or other road junction controlled by one or more traffic lights. Additionally, the traffic light 304 depicted in FIG. 3A has three lighting elements arranged vertically. The processing system of an autonomous vehicle may also process other traffic light fixtures having any number of lighting elements arranged in any orientation. Further, the traffic light depicted in FIG. 3A is connected to a pole on the ground in front of and to the left of the autonomous vehicle 302. However, in other example scenarios in which the example method may be performed, the traffic light may be suspended, mounted, or otherwise made visible in a variety of locations. Further, in some instances, the processing system may detect light indicators that convey information to pedestrians, and may additionally consider the pedestrian light indicators in providing instructions to control the vehicle. In other instances, the processing system may detect traffic indicators that indicate rules in which vehicles on the road must comply with, and may also consider the traffic indicators in providing instructions to control the vehicle. It should be understood that any combination of various traffic lights, pedestrian light indicators, traffic indicators, and intersection configurations might be present in other example scenarios in which the example method may be performed.

In some example scenarios, the autonomous vehicle 302 is stopped at an intersection, such as when the illuminated component of the traffic light is a color, such as red, that signals a vehicle to stop. In these example scenarios, the processing system performs the method of the present application to monitor the state of the traffic light. The processing system may perform the determination of the state of the traffic light periodically, so that instructions may be provided in response to a change of the state of the traffic light.

In other example scenarios, the autonomous vehicle 302 is in motion and is travelling toward an intersection at a particular speed. In these example scenarios, the processing system performs the method of the present application to determine the state of the traffic light as it approaches the intersection. Depending upon the determined state of the traffic light—or if attributes of the illuminated component of the traffic light are determined with a low level of confidence—the processing system may provide instructions to the control system of the autonomous vehicle to alter the vehicle's speed or direction. The particular speed in which the autonomous vehicle 302 is traveling may also be considered by the processing system in providing instructions to control the vehicle. As an example, the autonomous vehicle 302 may detect that the state of the traffic light signaling traffic to stop, and the autonomous vehicle 302 may determine a distance from the intersection at which to begin decreasing the speed of the vehicle based on the vehicle's speed. Similarly to the previously described scenario, the processing system may perform the determination of the state of the traffic light periodically to obtain the current state of the traffic light and provide corresponding instructions to control the vehicle.

In some instances, the processing system may identify a traffic indicator along the road in which the autonomous vehicle is travelling. In some cases, the identified traffic indicator might represent one or more rules that vehicles on the road must comply with. The processing system may provide instructions to alter the vehicle's speed or direction or, in some cases, modify the vehicle's path to abide by rules conveyed by an identified traffic indicator. As an example, the processing system may identify that a traffic indicator is a "STOP" sign based on determining that its color is red and that its shape is an octagon with a high level of confidence. In this example, the processing system may provide instructions to slow the vehicle to a stop. In some cases, the processing system may also identify text or symbols to aid in the classification of the traffic indicator. For instance, the processing system may modify the speed in which the autonomous vehicle is travelling responsive to identifying a traffic indicator that specifies a speed limit.

Although the scenario of FIG. 3A depicts an autonomous vehicle 302, a traffic light 304, and an intersection, other objects may be present that may or may not influence the operation of the autonomous vehicle. In some scenarios, the autonomous vehicle may be configured to perform other methods or processes in conjunction with the methods to detect a traffic light in the present application. These other methods or processes may determine the vehicle's location, speed, and the presence of objects sensed near the vehicle, among others, and may modify the operation of the autonomous vehicle based on those determinations.

Figure 3B:
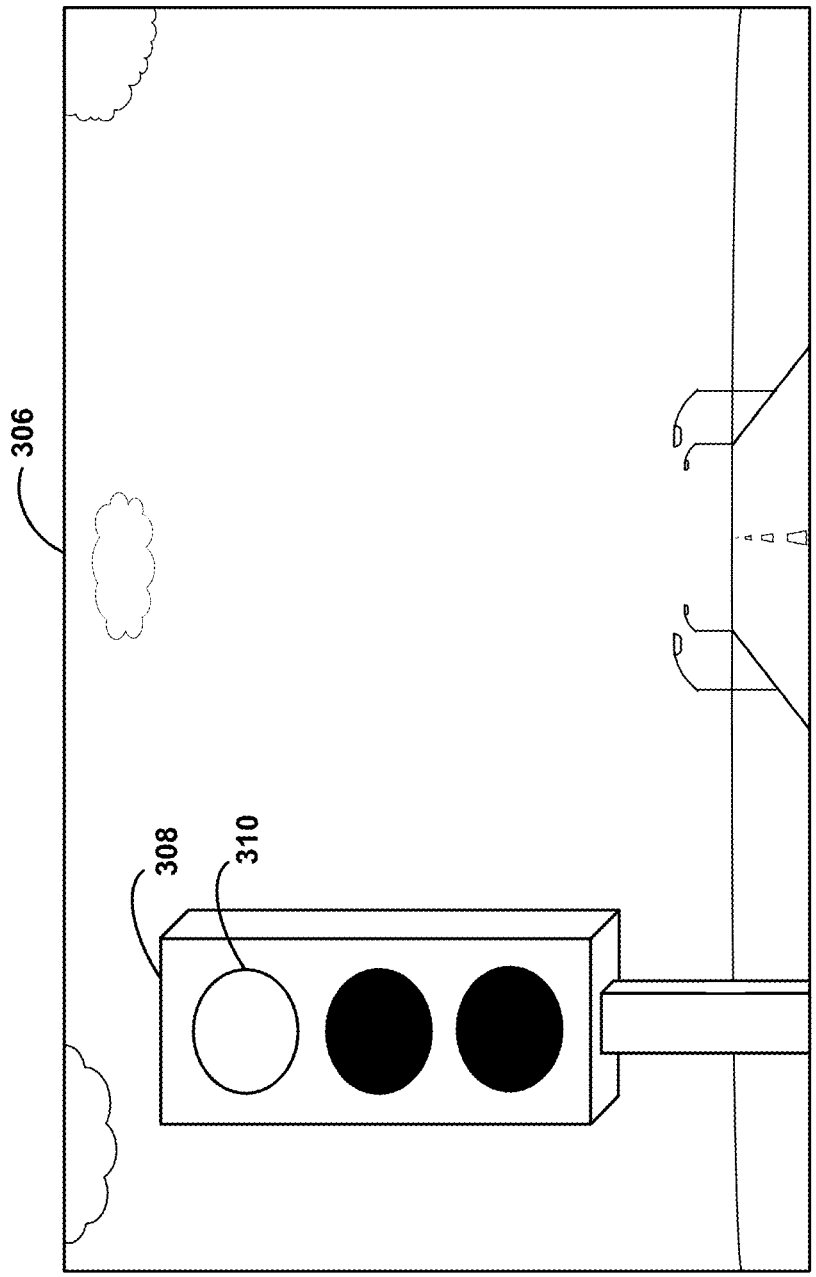
FIG. 3B illustrates an example image including a light indicator.
Figure 3C:
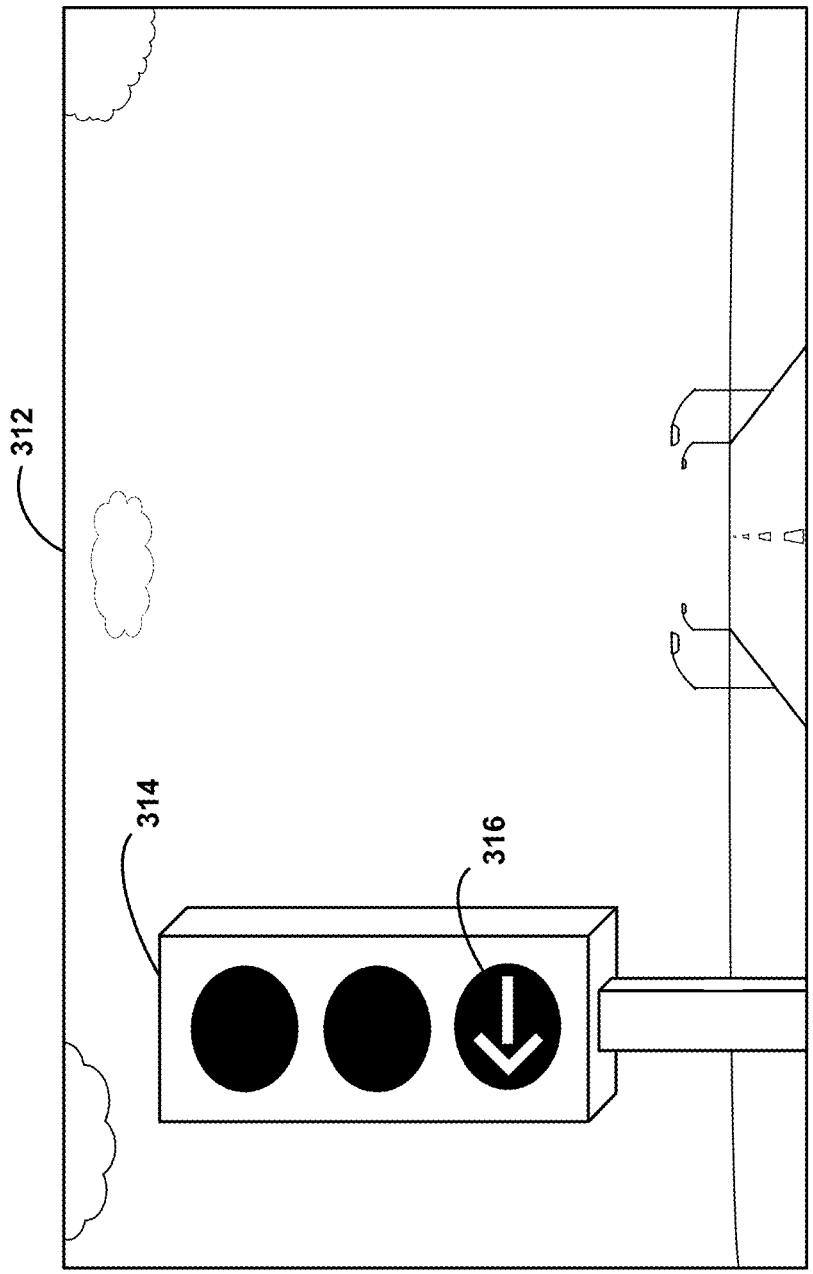
FIG. 3C illustrates another example image including a light indicator.
Figure 3D:
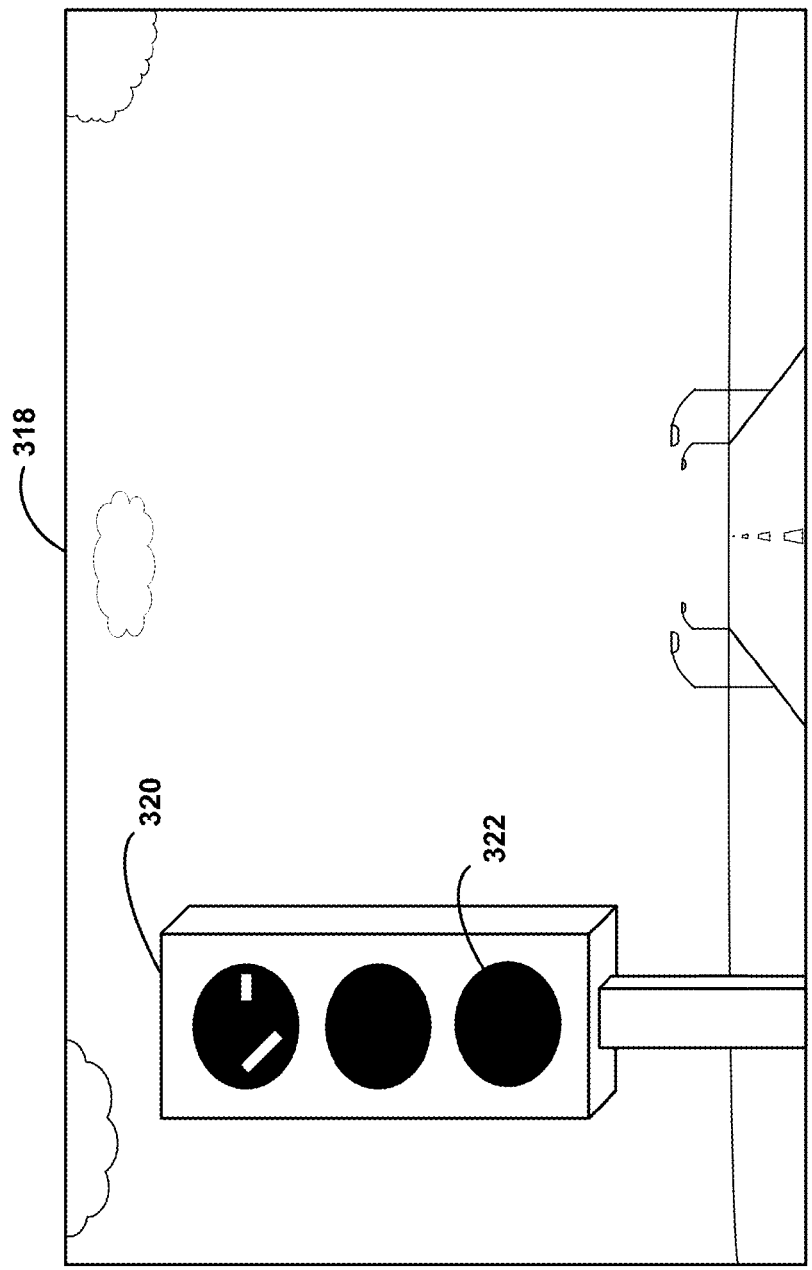
FIG. 3D illustrates yet another example image including a light indicator.

FIG. 3B, FIG. 3C, and FIG. 3D illustrate example images captured by a camera or other image-capture device coupled to an autonomous vehicle, such as vehicle 302 in the scenario depicted in FIG. 3A. The example images depict background elements, such as a road, street lamps, and clouds. It should be noted that the example images of FIG. 3B, FIG. 3C, and FIG. 3D serve merely as an illustration, and that other elements in the background may be present in other captured images. Additionally, the examples images depicted in FIG. 3B, FIG. 3C, and FIG. 3D depict an image captured within a close range of the traffic light; however, the method of the present application may be applied to an image captured at a further distance from the traffic light, so that the traffic light would appear smaller in the captured image. The example scenarios shown in FIG. 3B, FIG. 3C, and FIG. 3D serve merely as an illustration and may vary in different scenarios.

The traffic lights depicted in FIG. 3B, FIG. 3C, and FIG. 3D have three lighting elements arranged vertically. A black filled-in lighting element indicates that the lighting element is off and not illuminating light. A white filled-in lighting element indicates that the lighting element is on and illuminating light. In some instances, a portion of a lighting element may have both black and white portions, indicating a particular shape of the illuminated portion of the lighting element. For the purposes of explanation, and not to limit the scope of the present application, the top lighting element will be referred to herein as the "green light," the middle lighting element will be referred to herein as the "yellow light," and the bottom lighting element will be referred to herein as the "red light." Other traffic light configurations and colors may be received in an image depending upon, for example, the particular geographical region the vehicle is in.

The methods of the present application may be carried out by a computer system, an image processing system, or a dedicated processing system coupled to an autonomous vehicle. For the purposes of explanation, and not to limit the scope of the present application, the following descriptions for FIG. 3B, FIG. 3C, and FIG. 3D will describe the methods of the present application being performed by a "processing system."

FIG. 3B illustrates an example image containing a traffic light with an illuminated solid red light. A processing system coupled to an autonomous vehicle may receive the example image and determine information associated with the traffic light. The processing system determines a color of the illuminated component and a corresponding confidence level of the determination of the color. The confidence level represents an estimated accuracy that the determined color is correct. Then, the processing system determines a shape of the illuminated component and a corresponding confidence level of the determination of the shape. Based on at least one of the confidence level of the determination of the color and the confidence level of the determination of the shape exceeding a threshold value, the processing system provides instructions executable by a control system or a computing device to control the autonomous vehicle.

In the example image of FIG. 3B, the processing system may determine the color of the traffic light to be red and the shape of the traffic light to be round. The processing system may determine both the confidence level associated with the color and the confidence level associated with the shape to exceed the threshold value, and in response provide instructions to stop the vehicle, for example.

In some embodiments, the determinations of the color, shape, and confidence level are performed using machine-learning training data and classifier. In some examples, the data associated with the received image is compared against example images of traffic lights that all have similar features. For example, the received image may be compared with example images of traffic lights that are in a red light state; these are referred to as positive examples in the context of the solid red light example. The received image may additionally be compared with example images of traffic lights that are in other states; these are referred to as negative examples in the context of the solid red light example. The classifier may be trained using the positive examples and negative examples. In some embodiments, the processing system may determine attribute values—quantifiable properties or features of a particular image—from the positive examples and the negative examples to identify ranges of attribute values associated with a particular state of a traffic light. This process may be referred to as "training the classifier." The classifier may then be trained with example images for each of the traffic light states. The processing system may then identify attribute values from a received image and determine if it lies within or is close to a range of attribute values for a particular traffic light. As a specific example, if the processing system identifies that the attribute values of a received image fall within a range of attribute values associated with solid red lights, the processing system may determine that the received image contains a solid red light. An example property might quantify a color difference between two neighboring pixel values, although other example properties or features may be considered.

In some instances, comparing the received image with training data described above may be performed for any number of attributes in order to classify the traffic light. As an example, the received image may be compared against training data containing red lights, yellow lights, and green lights, and the processing system may determine confidence levels associated with each of the colors. The processing system may select the color having the highest associated confidence level as the determined color. The confidence level may be represented in a variety of ways, such as a percentage, ratio, or other number indicative of the estimated accuracy of the determinations.

Similarly, the processing system may compare the received image against training data associated with different shapes of illuminated components of traffic lights. In one embodiment, the processing system may select training data for determining the shape based on the determined color, such that the shape training data contains example images having traffic lights of the determined color. In another embodiment, the received image may be filtered to be monochrome or gray scale, and the filtered image may then be compared against shape training data that is also filtered, so that the shape determination is made independent of the color. In yet another embodiment, training data representing illuminated components having the same shape but various colors may be grouped together as one category, such that the attribute value range covers illuminated components that have particular shape but may be a variety of colors.

In some cases, the processing system may also compare the received image against training data associated with traffic indicators to classify a particular traffic indicator based on its color, shape, luminance, and text or symbols that may be present on the traffic indicator. The text or symbols may be identified similarly to the machine-trained classifiers described above, or may use an alternative form of character recognition. Training data may vary depending on the current geographical location of the autonomous vehicle. In some geographical locations, traffic indicators may include one or more mechanical elements that move or otherwise change the appearance of the indicator; thus, the processing system may determine the state of a particular traffic indicator periodically to identify possible changes in the appearance of the indicator. In some cases, when identifying the illuminated component of traffic lights, the luminance of the pixels may be considered to distinguish light-emitting objects from other objects. In some embodiments, the processing system may determine the luminance and a confidence level associated with the determination of the luminance based on luminance training data.

It should be noted that the classifier discussed above may be any mathematical function or machine-learning data structure that maps data of an image to a particular category. The confidence levels may also be determined using a variety of statistical models in order to achieve a desired result.

In some instances, the processing system may combine multiple attributes for a particular classification, such that a received image having any one of the multiple attributes might fall within that particular classification. As an example, the processing system may determine whether the traffic light is either a red light or a yellow light. In some scenarios, the instructions provided by the processing system to control the vehicle may be the same for a red light or a yellow light. Classifying the received image as having at least one of multiple attributes may be simpler to compute, thus allowing the processing system to quickly respond to changes in the state of a traffic light.

In some embodiments, the processing system performs the determinations of the color, shape, and associated confidence levels sequentially. In some instances, the determination of the color and the confidence level of the determination of the color are performed before the determination of the shape and the confidence level of the determination of the shape. In some cases, identifying each attribute, such as the color and shape, separately may be more accurate than identifying a combination of multiple attributes. As an example, the attribute value ranges for solid green lights may be very close to the attribute values for green left turn arrows, although the instructions provided to control the vehicle are significantly different. By identifying the color attribute and the shape attribute separately, the ranges of attribute values may broader, and the possible uncertainty of the state of the traffic light may be greatly reduced. In some embodiments, the processing system may provide instructions to control a vehicle based on the determined color prior to determining the shape. The processing system may be configured to have a number of classifiers in a hierarchy or another prioritized decision structure in order to accomplish sequential execution in this manner. In some instances, the hierarchy of classifiers may be arranged from most important features to least important features. Other arrangements in the order of classification may be possible.

In some embodiments, the processing system performs the determinations of the color, shape, and associated confidence levels in parallel. The processing system may include multiple threads that execute portions of the processing simultaneously. The processing system may further include multiple processing cores to allow for parallel execution of the method. Other arrangements of the processing system may exist to allow for parallel execution.

In some embodiments, the processing system determines a portion of the received image having the traffic light or the illuminated component of the traffic light as an image patch. An image patch may be a part of the whole received image. In some cases, the image patch is a smaller area from the whole received image that contains a traffic light or an illuminated component of a traffic light. Determining the image patch may be achieved using object recognition methods that detect features of the traffic light. In some instances, the image patch may be determined separately from the processing system by another computing device, and the determined image patch may then be provided to the processing system.

An autonomous vehicle may include a wireless communication system configured to send and receive data. The wireless communication system may receive data for modifying or updating aspects of the method, such as the training data described above.

FIG. 3C illustrates another example image containing a traffic light with an illuminated green light in the shape of a left arrow. The determination of the shape, color, and associated confidence levels of the illuminated portion of the traffic light in FIG. 3C are performed similarly to the determinations performed on the received image illustrated by FIG. 3B. The processing system may determine the color of the traffic light in FIG. 3C to be green and the shape to be a left arrow using the classification methods described above. In this example, because the left arrow is displaying correctly and is unobstructed, and the processing system may determine the shape and color of the illuminated component with a high confidence level.

Based on the processing system determining the traffic light to be a green left arrow, the processing system may provide instructions to control the vehicle corresponding to green left arrows. In some instances, this may involve the control system of the vehicle controlling the vehicle's throttle and steering. It should be noted that, in some cases, other factors may be considered when controlling the throttle and steering of the vehicle, such as the proximity of nearby vehicles, the angle of the turn in the intersection, and whether pedestrians are present, among other considerations.

In some cases, the processing system may consider the speed of the autonomous vehicle when providing instructions to control the autonomous vehicle. The speed of the vehicle may be determined using a variety of methods, such as from an electronic speedometer, using GPS coordinates over a period of time or from other sensors, such as accelerometers and inertial measurement units, or any combination thereof. The processing system may receive measurements indicative of the speed of the vehicle. In some cases, the speed of the vehicle may influence a time at which certain instructions are provided. As an example, if the vehicle is travelling at a particular speed and the processing system detects a solid red light ahead, the processing system may determine a distance from the solid red light to begin slowing down the vehicle. As another example, if a solid red light is detected, the processing system may determine an extent of braking to apply in order to slow down the vehicle that is proportionate to the speed in which the autonomous vehicle is travelling. In other examples, the processing system may consider the autonomous vehicle's speed when approaching an intersection in order to determine a safe course of action in the event of a change in the state of a traffic light.

In some instances, a captured image may include more than one traffic light, light indicator, or other traffic indicator. The processing system may determine a distance for each identified traffic indicator. In some embodiments, the processing system determines the traffic indicator nearest to the autonomous vehicle, and provides instructions based on the nearest traffic indicator. The processing system may determine the distance of the traffic indicator using sensor data, object recognition techniques, or from data that includes the locations of the traffic indicators, such as map data.

In other instances, a captured image may include a traffic light, light indicator, or other traffic indicator at a considerably far distance from the vehicle. The processing system may determine the distance of the traffic indicator using similar techniques as described above. The processing system may then compare that determined distance to a distance threshold, and subsequently provide instructions if the traffic indicator is below that distance threshold.

FIG. 3D illustrates yet another example image containing a traffic light in which a portion of the red light is illuminated. In this example, the portion of the red light that is illuminated represents a portion of a left turn arrow as illuminated. This may be the case if light bulbs within the lighting component are broken, electrical signals powering the light bulbs of the lighting component are disconnected or otherwise incorrectly provided, or if an object is obstructing a portion of the lighting component, among other situations. The processing system may determine that the portion of the red light that is illuminated is red within a high confidence level, but may then determine the shape of the light with a low confidence level. In some cases, the shape classification may result in determining that the shape of the traffic light being a shape that is different than a left turn arrow, although the corresponding confidence level may be very low. Even if the classification of the shape results in determining a left arrow, the low confidence level may be below the threshold level.

In this instance, the processing system provides instructions to control the autonomous vehicle on the basis of the determination of the color being red, and may cause the vehicle to stop at the intersection, for example. In some situations, such as the preceding example, the color of the light may provide a sufficient basis to control the vehicle.

A particular state of a traffic light may be associated with one or more characteristics. For example, a traffic light having a green left arrow illuminated may be considered to have a green color characteristic and a left arrow shape characteristic. The processing system may determine one or more characteristics of the state of the traffic light, and subsequently provide instructions to control the autonomous vehicle based on the determined one or more characteristics. For example, if the color characteristic of the state of the traffic light is determined to be red with high confidence, but the shape characteristic of the state of the traffic light is not determined, the processing system may provide instructions to control the vehicle based on the determined color characteristic of the state of the traffic light being red.

It should be noted that the methods carried out by the processing system may be performed to identify and classify any traffic light, light indicator (such as a pedestrian light or a grade crossing light), or traffic indicator (such as road signs and signposts). The training data discussed above may be updated or otherwise modified to apply the method to classify various indicators associated with directing traffic flow of vehicles and pedestrians.

Figure 4:
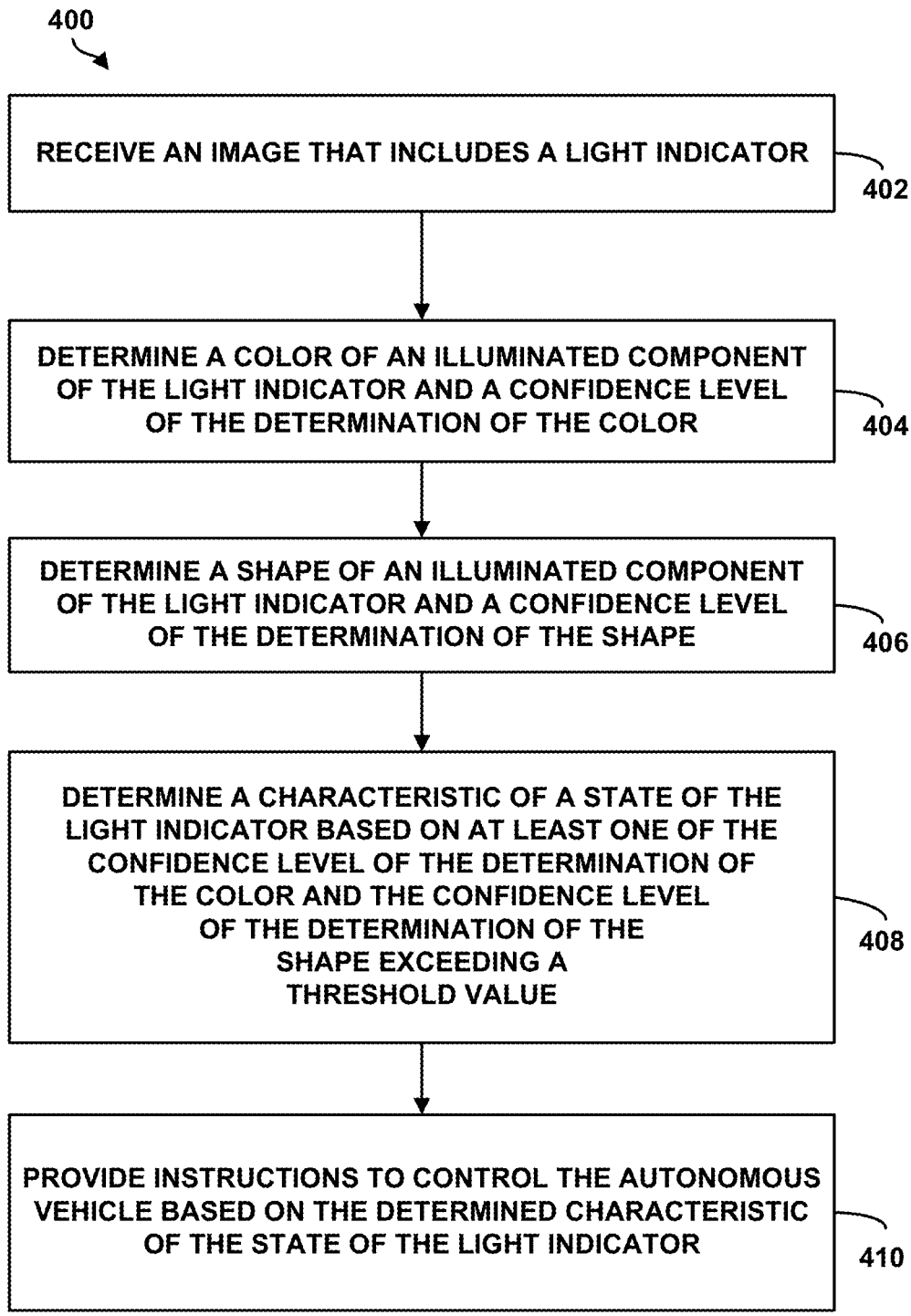
FIG. 4 illustrates an example method for real-time image-based traffic light detection.

FIG. 4 illustrates an example method 400 for real-time image-based traffic light detection. A method 400 is provided for real-time image-based traffic light detection for an autonomous vehicle. The method could be performed to detect traffic lights or other light indicators associated with directing traffic flow of cars and pedestrians in the captured images and videos, similar to what was described with respect to FIG. 3A, FIG. 3B, FIG. 3C, and FIG. 3D; however, the method 400 is not limited to the scenarios shown in FIG. 3A, FIG. 3B, FIG. 3C, and FIG. 3D. FIG. 4 illustrates the blocks in an example method for real-time image-based detection of traffic lights and other traffic indicators for the autonomous vehicle. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes receiving an image that includes a light indicator. As previously discussed, the autonomous vehicle includes a camera. In some embodiments, a camera is configured to capture either still images or videos from the vehicle that include a light indicator. The camera stores the captured images or videos in a memory. At block 402, the processing system may receive the captured images or videos from the memory. In additional embodiments, the processing system may receive images or videos directly from the camera. In either of the configurations, the processing system receives data representative of images or videos for processing. If the received data corresponds to a video, a single frame may be extracted from the video to be processed. Additionally, multiple frames of a video may be analyzed sequentially or in parallel.

The image received at block 204 may be similar to the example images shown in FIG. 3B, FIG. 3C, and FIG. 3D. The camera may capture the image using a variety of settings, such as a particular shutter speed and exposure, in order to achieve a desired result. Further, the captured images may be filtered, cropped, or otherwise altered before being sent to the processing system for classification.

Block 404 includes determining a color of an illuminated component of the light indicator and a confidence level of the determination of the color. As discussed above, the determination of the color and the associated confidence level may be performed using a machine-learning structure and training data. In some embodiments, the color is determined from among a predetermined set of colors that may correspond to expected colors of a light indicator. For certain traffic lights, the predetermined set of colors may include red, yellow, and green, although other colors may be used in certain geographical areas. As another example, the predetermined set of colors may include white and amber if the processing system is configured to detect certain pedestrian crossing light indicators. The predetermined set of colors may vary depending on various situations.

Block 406 includes determining a shape of an illuminated component of the light indicator and a confidence level of the determination of the shape. As discussed above, the determination of the shape and the associated confidence level may be performed using a machine-learning structure and training data. In some embodiments, the shape is determined from among a predetermined set of shapes that may correspond to expected shapes of a light indicator. For certain traffic lights, the predetermined set of shapes may include a solid circle, a left arrow, an up arrow, and a forward arrow, although other shapes may be used in certain geographical areas. As another example, the predetermined set of shapes may include a walking stick figure and a hand if the processing system is configured to detect certain pedestrian crossing light indicators. The predetermined set of shapes may vary depending on various situations.

Block 408 includes determining a characteristic of a state of the light indicator based on at least one of the confidence level of the determination of the color and the confidence level of the determination of the shape exceeding a threshold value. A state of a traffic indicator may have characteristics, such as a color characteristic and a shape characteristic. In some instances, only one of the shape characteristic or the color characteristic of the traffic indicator is determined with a high level of confidence (i.e. only a partial state of the traffic light is confidently determined). Thus, if at least one of the confidence levels exceeds a threshold value, a characteristic of the light indicator may be determined.

In some embodiments, a confidence level being above the threshold indicates that the determination is correct, whereas the confidence level being below the threshold indicates that the determination is incorrect. In some instances, the threshold may be the same for the determined confidence levels. In other instances, the threshold may be different for each confidence level.

Block 410 includes providing instructions to control the autonomous vehicle based on the determined characteristic of the state of the light indicator. In some instances, the instructions may be provided to a control system of an autonomous vehicle. The instructions may correspond with a particular path and a manner in which the vehicle travels along the particular path. The control system may cause the vehicle to travel along the particular path in the determined manner by adjusting the throttle, brake, steering, and other systems that influence the speed and direction of the vehicle. The control system may modify the vehicle's translational velocity, rotational velocity, or both based on the provided instructions. One or more instructions may correspond to determined states of traffic lights. In some instances, the particular instruction provided to the control system is influenced by the speed and direction in which the vehicle is traveling, in addition to the determined states of traffic. In various embodiments, the state of the traffic light may influence the operation of the autonomous vehicle, along with other factors such as objects near the vehicle.

In some embodiments, the disclosed methods may be implemented as computer program instructions encoded on a computer-readable storage media in a machine-readable format, or on other non-transitory media or articles of manufacture. FIG. 5 illustrates an example computer readable medium in the form of a computer program product 500 that includes a computer program for executing a computer process on a computing device, arranged for real-time image-based detection of traffic lights and other traffic indicators. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-410 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   receiving, from an image-capture device coupled to an autonomous vehicle, an image that includes a light indicator, wherein the light indicator comprises an illuminated component;
   determining, from the received image, a color of the illuminated component of the light indicator and an associated confidence level of the determination of the color of the illuminated component;
   determining, from the received image, a shape of the illuminated component of the light indicator and an associated confidence level of the determination of the shape of the illuminated component;
   based on at least one of the confidence level of the determination of the color and the confidence level of the determination of the shape exceeding a threshold value, determining a characteristic of a state of the light indicator; and
   providing instructions executable by a computing device to control the autonomous vehicle based on the determined characteristic of the state of the light indicator.

2. The method of claim 1, wherein determining the color of the illuminated component of the light indicator and determining the shape of the illuminated component of the light indicator are performed in parallel.

3. The method of claim 1, wherein determining the color of the illuminated component of the light indicator and determining the shape of the illuminated component of the light indicator are performed sequentially.

4. The method of claim 1, wherein the instructions comprise first instructions executable by the computing device, wherein the characteristic is a first characteristic, and wherein the method further comprises:
   based on the confidence level of the determination of the color exceeding a first threshold value and the confidence level of the determination of the shape being below a second threshold, determining a second characteristic of the state of the light indicator; and providing instructions executable by the computing device corresponding to the determined color to control the autonomous vehicle based on the determined second characteristic of the state of the light indicator.

5. The method of claim 1, further comprising:

based on the confidence level of the determination of the color being below a first threshold value and the confidence level of the determination of the shape being below a second threshold value, providing instructions executable by the computing device to stop the autonomous vehicle.

6. The method of claim 1, wherein determining the color of the illuminated component is performed independently of determining the shape of the illuminated component.

7. The method of claim 1, wherein the characteristic is a first characteristic, and wherein the method further comprises:

based on the determined color of the illuminated component being red and the confidence level of the determination of the color exceeding a first threshold value, determining a second characteristic of the state of the light indicator; and providing second instructions executable by the computing device to stop the autonomous vehicle based on the determined second characteristic of the state of the light indicator.

8. The method of claim 1, further comprising:

determining an image patch from the received image, wherein the image patch comprises a portion of the received image containing at least the illuminated component of the light indicator, wherein the color of the illuminated component of the light indicator is determined from the image patch, and wherein the shape of the illuminated component of the light indicator is determined from the image patch.

9. An image processing system of an autonomous vehicle comprising:

an image-capture device;

at least one processor; and a memory having stored thereon instructions that, upon execution by the at least one processor, cause the image processing system to perform functions comprising:

receiving, from the image-capture device coupled to the autonomous vehicle, an image that includes a particular traffic indicator;

determining, from one or more predetermined colors, (i) a color of the particular traffic indicator in the received image and (ii) an associated confidence level of the determination of the color representative of an estimated accuracy of the determined color;

determining, from one or more predetermined shapes, (i) a shape of the particular traffic indicator in the received image and (ii) an associated confidence level of the determination of the shape representative of an estimated accuracy of the determined shape; and based on at least one of the confidence level of the determination of the color and the confidence level of the determination of the shape exceeding a threshold value, providing executable instructions to control the autonomous vehicle.

10. The image processing system of claim 9, wherein (i) determining the color of the traffic indicator and the associated confidence level of the determination of the color and (ii) determining the shape of the traffic indicator and the associated confidence level of the determination of the shape are performed sequentially, and wherein, based on the confidence level of the determination of the color exceeding the threshold value, the executable instructions are provided prior to determining the shape of the traffic indicator and the associated confidence level of the determination of the shape.

11. The image processing system of claim 9, wherein the executable instructions comprise first executable instructions, and wherein the method further comprises:

based on the confidence level of the determination of the color exceeding a first threshold value and the confidence level of the determination of the shape exceeding a second threshold, providing second instructions executable by the computing device to control the autonomous vehicle corresponding to the determined color and the determined shape.

12. The image processing system of claim 9, wherein the traffic indicator includes a light indicator, and wherein the received image includes a plurality of light indicators, and wherein the functions further comprise:

determining, for given light indicators of the plurality of light indicators, a distance between the autonomous vehicle and the given light indicator; and determining the particular light indicator as a light indicator nearest to the autonomous vehicle from among the given light indicators based on the determined distances.

13. The image processing system of claim 9, wherein the functions further comprise:

determining a distance between the autonomous vehicle and the particular traffic indicator;

determining whether the distance between the autonomous vehicle and the particular traffic indicator exceeds a distance threshold value; and based on the distance between the autonomous vehicle and the particular traffic indicator being below the distance threshold value, providing executable instructions to control the autonomous vehicle.

14. The image processing system of claim 9, wherein a predetermined color of the one or more predetermined colors corresponds to providing executable instructions to stop the autonomous vehicle.

15. The image processing system of claim 9, wherein a predetermined color of the one or more predetermined colors corresponds to providing executable instructions to maintain a speed of the autonomous vehicle or accelerate the autonomous vehicle.

* * * * *